(12) United States Patent  (10) Patent No.: US 9,292,320 B2
Uyeda et al.  (45) Date of Patent: *Mar. 22, 2016

(54) VIRTUAL MACHINE PACKING METHOD USING SCARCITY

(71) Applicant: Microsoft Corporation, Redmond, WA (US)

(72) Inventors: Lincoln K. Uyeda, Seattle, WA (US); Rina Panigrahy, Sunnyvale, CA (US); Ehud Wieder, Sunnyvale, CA (US); Kunal Talwar, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,240

(22) Filed: Jun. 10, 2013

(65) Prior Publication Data

US 2013/0275977 A1  Oct. 17, 2013

Related U.S. Application Data

(63) Continuation of application No. 12/422,123, filed on Apr. 10, 2009, now Pat. No. 8,464,267.

(51) Int. Cl.
  *G06F 9/455* (2006.01)
  *G06F 9/50* (2006.01)
(52) U.S. Cl.
  CPC .............. *G06F 9/455* (2013.01); *G06F 9/5044* (2013.01); *G06F 9/5077* (2013.01); *G06F 9/5088* (2013.01)
(58) Field of Classification Search
  CPC ..... G06F 9/455; G06F 9/5044; G06F 9/5077; G06F 9/5088
  USPC .............................................. 718/1, 104, 105
  See application file for complete search history.

(56) References Cited

U.S. PATENT DOCUMENTS

| | | |
|---|---|---|
| 7,203,944 B1 | 4/2007 | van Rietschote et al. |
| 7,707,579 B2 | 4/2010 | Rodriguez |
| 7,730,486 B2 | 6/2010 | Herington |
| 8,230,069 B2 | 7/2012 | Korupolu |
| 2002/0198756 A1 | 12/2002 | Ghasisas et al. |
| 2005/0060590 A1 | 3/2005 | Bradley et al. |
| 2005/0273341 A1 | 12/2005 | Hoffesommer |

(Continued)

OTHER PUBLICATIONS

Non-Final Office Action, U.S. Appl. No. 12/422,123 mailing date Sep. 14, 2012, pp. 13.

(Continued)

*Primary Examiner* — Benjamin Geib

(74) *Attorney, Agent, or Firm* — Henry Gabryjelski; Kate Drakos; Micky Minhas

(57) ABSTRACT

A method for packing virtual machines onto host devices may calculate scarcity values for several different parameters. A host's scarcity for a parameter may be determined by multiplying the host's capacity for a parameter with the overall scarcity of that parameter. The sum of a host's scarcity for all the parameters determines the host's overall scarcity. Hosts having the highest scarcity are attempted to be populated with a group of virtual machines selected for compatibility with the host. In many cases, several different scenarios may be evaluated and an optimal scenario implemented. The method gives a high priority to those virtual machines that consume scarce resources, with the scarcity being a function of the available hardware and the virtual machines that may be placed on them.

20 Claims, 4 Drawing Sheets

(56) References Cited

U.S. PATENT DOCUMENTS

| | | |
|---|---|---|
| 2006/0069761 A1 | 3/2006 | Singh et al. |
| 2007/0204266 A1 | 8/2007 | Beaty et al. |
| 2008/0295096 A1 | 11/2008 | Beaty et al. |
| 2009/0204826 A1 | 8/2009 | Cox et al. |

OTHER PUBLICATIONS

Notice of Allowance, U.S. Appl. No. 12/422,123, mailing date Feb. 19, 2013, pp. 8.

VIRTUAL MACHINE PACKING METHOD USING SCARCITY

CROSS REFERENCE TO RELATED APPLICATIONS

This application claims the benefit of and priority to U.S. patent application Ser. No. 12/422,123, now U.S. Pat. No. 8,464,267, entitled "Virtual Machine Packing Method Using Scarcity", filed Apr. 10, 2009 by Lincoln K. Uyeda et al., the entire contents of which are expressly incorporated by reference.

BACKGROUND

Virtual machines are computer software implementations of a computer device, where the virtual machine may execute programs like a physical computer. Virtual machines are widely used in data centers where hundreds or thousands of host machines may be operating. In order to manage the computing resources, many data centers run server computers as virtual machines because virtual machines can be moved from one host device to another.

Many data centers operate on a cyclical basis, where demand may be higher during certain periods of the day or certain days of the week. During low demand times, virtual machines may be consolidated to certain host machines so that other host machines may be turned off or operated in a reduced power mode.

In many cases, a datacenter may consume large amounts of electricity. As hardware is turned off during periods of reduced computer load, the datacenter may reduce its electricity costs substantially.

The process of placing virtual machines onto host devices may be a complex packing problem.

SUMMARY

A method for packing virtual machines onto host devices may calculate scarcity values for several different parameters. A host's scarcity for a parameter may be determined by multiplying the host's capacity for a parameter with the overall scarcity of that parameter. The sum of a host's scarcity for all the parameters determines the host's overall 'size'. Hosts having the largest 'size' are attempted to be populated with a group of virtual machines selected for compatibility with the host. In many cases, several different scenarios may be evaluated and an optimal scenario implemented. The method gives a high priority to those virtual machines that consume scarce resources, with the scarcity being a function of the available hardware and the virtual machines that may be placed on them.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
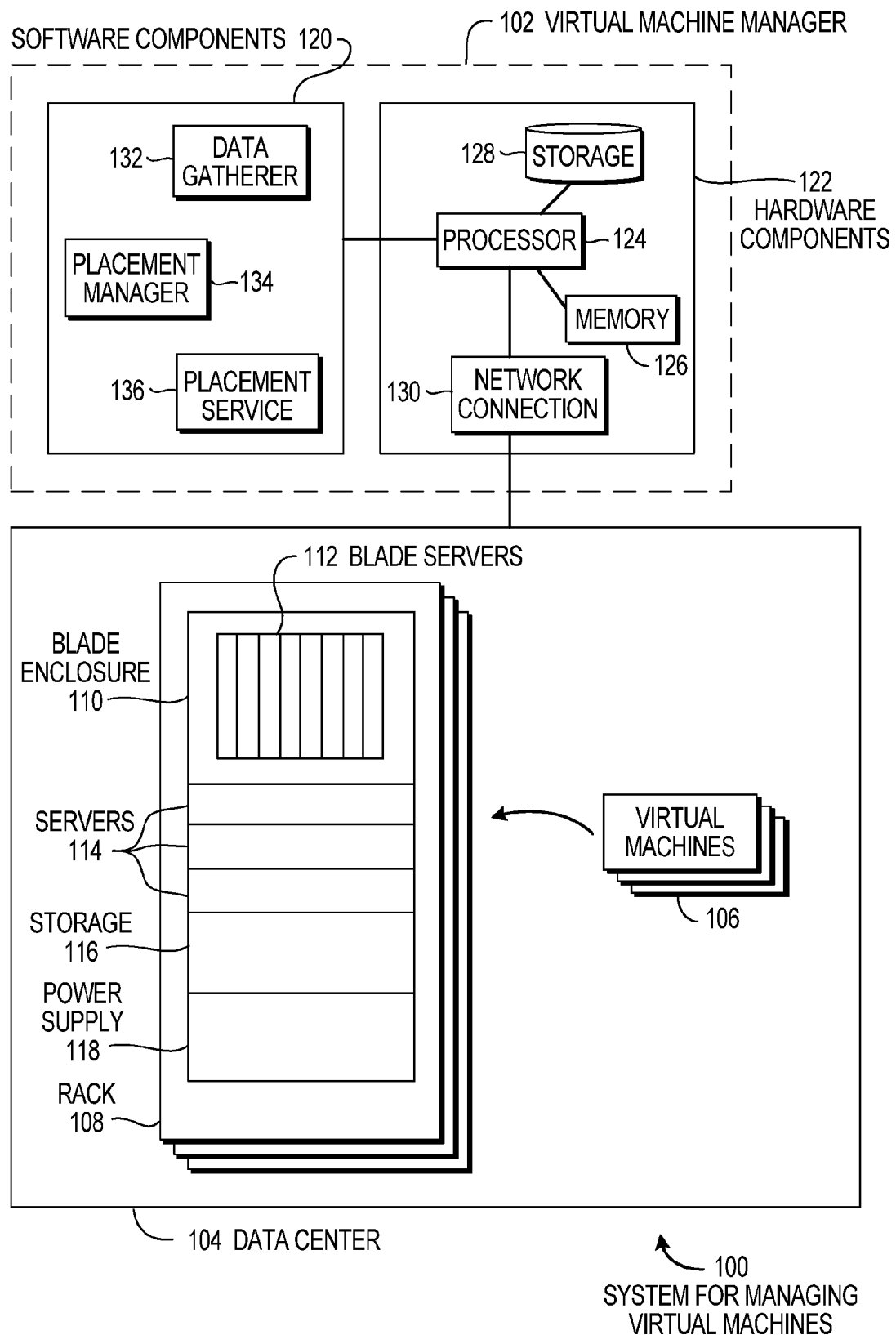
FIG. 1 is a diagram illustration of an embodiment showing a system for managing virtual machines.

Several virtual machines may be placed onto multiple host devices using a heuristic based on the scarcity of various monitored dimensions. The scarcity mechanism may identify hosts that have a resource that is in high demand and may pack the virtual machines according to the resource.

The heuristic may be applied in several manners. In one case, the heuristic may be used to determine an optimized placement of virtual machines across an entire datacenter. In another case, a group of virtual machines may be placed onto a set of hosts that are already running one or more virtual machines.

The heuristic may be used to analyze multiple combinations of virtual machine placement and to select an optimized version from the combinations. In such embodiments, many millions of options may be simulated and one may be selected based on the simulations.

Throughout this specification and claims, the term 'host' is used to describe a physical hardware platform on which a virtual machine may be executed. In some embodiments, a lightweight operating system may run on the host and may support one, two, or many more virtual machines. In some embodiments, many tens or even hundreds of virtual machines may be executed on one physical host device.

The term 'host' may be any type of hardware platform on which a virtual machine may be executed. In some cases, the hardware platform may be a server computer with specialized processors, memory, disk storage, and network connections that are specifically designed to run virtual machines. In other cases, the host may be a conventional desktop or server computer, or may be a portable device such as a mobile phone, laptop computer, or other device. For the purposes of this specification, many examples of using the heuristic may involve datacenter applications, however, those skilled in the art will appreciate that many other implementations may be possible.

As an example of an application other than the datacenter, a loosely connected group of personal computers may be used as hosts to perform background processing by hosting one or more virtual machines. The background processing may execute virtual machines during the times that the personal computers are idle. Such an embodiment may be used for performing massive computational problems that may not be time sensitive, for example. In such an embodiment, the heuristic described in this specification may be applied to place multiple virtual machines across hosts that may have wide variations in capacities and capabilities.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Further-more, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, µF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, resources, data structures, etc. that perform particular tasks or implement particular abstract data types. Typically, the functionality of the program modules may be combined or distributed as desired in various embodiments.

FIG. 1 is a diagram of an embodiment 100 showing a system for managing virtual machines. Embodiment 100 is a simplified example of a system that may manage virtual machines on several host devices.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a datacenter that may contain many host devices, each of which may execute multiple virtual machines. Virtual machines may be a software version of a device. In a large datacenter environment, server computers may be implemented as virtual machines. As demand shrinks, virtual machines may be consolidated onto some host devices so that other hosts may be powered down or operated in a reduced energy state. As demand rises, hosts may be brought online and virtual machines may be spread among the available hosts.

In many cases, hosts may have different capabilities and different capacities. The resources available on a host may be categorized into consumable and non-consumable resources.

A consumable resource is one that is consumed by a virtual machine and cannot be shared with other virtual machines or a host operating system. An example of a consumable resource may be random access memory (RAM). Each virtual machine may have a dedicated amount of RAM assigned to the virtual machine, and that RAM may not be used by other virtual machines. Another example may be disk space or other storage.

In some cases, a consumable resource may be considered as a summation of various component resources. For example, a hard disk resource may be considered the summation of disk read speed, disk write speed, and capacity.

A non-consumable resource may be a resource that can be shared by virtual machines or by a host operating system. An example may be a number of processors available on a host device. Some virtual machines may operate using two, four, or more processors or cores. Even though a virtual machine uses four processors, other virtual machines or the host operating system may also use the same processors.

A binary resource may be a subset of a non-consumable resource. A binary resource may be a resource that is either present or not on a host. For example, a host may or may not have a graphics processor or other feature that may be used by a particular virtual machine.

The various resources may be discussed in this specification as dimensions for consideration when placing virtual machines onto hosts. The term 'dimensions' is intended to include resources or any other factor that may be considered when matching virtual machines to a host. In some cases, a dimension may not correspond to a resource available on a host or used by a virtual machine.

The virtual machines may be placed on hosts using a concept of scarcity that may be calculated for the various dimensions. Hosts having the scarcest resources may be considered first when attempting to place virtual machines so that the scarce resources are properly allocated. The scarcest dimensions may drive the virtual machine placement process by sorting and selecting hosts and virtual machines based on the scarcity of the dimensions.

The virtual machine placement may be analyzed by considering the placement of multiple virtual machines in many different combinations. By selecting combinations that conform to a heuristic, a reduced set of virtual machine combinations may be considered as opposed to considering every combination of virtual machines and hosts.

In many datacenters, several thousands or even tens of thousands of host devices may be present, each of which may execute several virtual machines. In such an embodiment, considering every combination of virtual machine and host device may take an extraordinary amount of processing time. The heuristic may be used to reduce the number of combinations to consider to a more reasonable amount, allowing large datacenter applications to be considered.

The heuristic involves gathering supply and demand data. Supplied resources or dimensions may be gathered from the hosts, and resources or dimensions may be demanded by the virtual machines. By considering supply minus demand divided by supply, a dimensionless value may be obtained as a scarcity factor for each individual dimension. Those dimensions having a high scarcity factor indicate that the dimensions may be the gating items in successfully placing virtual machines.

After determining a scarcity factor for each dimension, a scarcity score for a host may be computed by multiplying the scarcity factor by the capacity for the dimension divided by the maximum value and multiplied by the scarcity factor. The sum of all dimensions may be used as a scarcity score for the host. The scarcity score may be considered a 'size' for the host. Hosts having the greatest 'size' may be considered first when placing virtual machines. The hosts with the greatest 'size' may have the largest amount of the scarcest resources.

The heuristic may involve identifying a set of virtual machines to consider for placement onto a specific host. In some cases, a binary or non-consumed resource may eliminate one or more virtual machines from consideration for particular host. For example, a virtual machine that runs on four processors may be eliminated from consideration if a host only has two processors.

The set of virtual machines that are considered may also include removing virtual machines that may be incompatible with each other. For example, many datacenters may have virtual machines that provide redundant services so that if a host fails and a virtual machine is unavailable, another host with a redundant virtual machine may still be operational. In such an example both of the redundant virtual machines may not be located on the same host.

In order to remove incompatible virtual machines, relationships between various virtual machines may be identified and an independent set of virtual machines may be selected.

The heuristic may be used to evaluate a set of hosts in different scenarios. In one scenario, an optimized placement of virtual machines may be considered across an entire datacenter of host devices that are not hosting any virtual machines. Such a scenario may be useful when considering a fully optimized datacenter, regardless of any starting condition.

In a second scenario, the placement of a group of virtual machines may be evaluated with a given set of starting conditions. Such a scenario may involve considering a set of virtual machines already placed onto hosts and may find a placement for a second group of virtual machines onto a set of hosts executing a first group of virtual machines. In such a scenario, the virtual machines that are placed onto a host may be selected to be compatible with any existing virtual machines on the host.

When a set of starting conditions are considered, the scarcity of a resource may be calculating using the available amount of a resource. In other words, the available amount of a resource may be the total amount of the resource provided by a host, minus the consumed amount of the resource by any virtual machine already assigned to the host. This mechanism may alter the scarcity of the dimensions drastically than when considering the first scenario.

Embodiment 100 is an example of a system for managing virtual machines in a datacenter environment. The virtual machine manager 102 may be a device that organizes a datacenter 104, where multiple virtual machines 106 may be executed by various host devices.

In a datacenter 104, a rack 108 may contain multiple host devices. A typical datacenter may have racks with blade enclosures 110 that may include multiple blade servers 112. Some racks may include standalone servers 114, storage devices 116, and power supplies 118. In many cases, a rack or group of racks may have cooling systems, power conditioning units, uninterruptible power supplies, and other components.

Datacenters may consume large amounts of energy, but may have data loads that may change during the course of the day, days of the week, or other seasonal variation. During periods of low demand, virtual machines may be moved off of certain hosts so that those hosts may be shut down or operated in a reduced power mode. In such a case, a group of hosts may be identified and those virtual machines currently on the hosts may be placed onto the remaining hosts, while the remaining hosts may continue to operate other virtual machines.

When a group of hosts may be identified for reduced power mode or for power off mode, a datacenter operator may wish to power down an entire rack of devices or groups of racks so that some of the overhead services, such as cooling and power supplies may be also be shut down or operated in a reduced power mode. The virtual machines operating on those racks may be moved to other hosts.

In many datacenters, different host may have different capabilities. Older devices may have slower processing speeds or may have less memory than newer devices. In some cases, newer devices may have capabilities that older devices may not have.

Some virtual machines may have different resource demands than other virtual machines. For example, some virtual machines may consume large amounts of processor capacity while other virtual machines may consume miniscule amounts of the same resource. In another example, some virtual machines may perform large amounts of disk operations while other virtual machines may not.

The virtual machine manager 102 may be an application that operates on a hardware platform. The virtual machine manager 102 may be comprised of software components 120 that operate on hardware components 122. The hardware components 122 may include a processor 124, random access memory 126, disk or other storage 128, and a network connection 130. In some embodiments, the hardware components 122 may be virtualized.

The virtual machine manager 102 may have software components 120 that include a data gatherer 132, a placement manager 134, and a placement service 136. The data gatherer 132 may collect status of various dimensions from host devices and virtual machines. The placement manager 134 may determine a placement for a set of virtual machines on the hosts, and the placement service 136 may move the virtual machines to the designated hosts.

Embodiment 200 presented later in this specification may illustrate one method that incorporates the operations of the software components 120. Embodiment 300 may illustrate one method that may be performed by a data gatherer 132 and embodiment 400 may illustrate one method that may be performed by the placement manager 134.

The data gatherer 132 may collect data on dimensions or resources supplied by hosts and demanded by virtual machines. The supply and demand information may be used to determine scarcity of the various dimensions, which may in turn be used by the placement manager 134 to determine various placements for virtual machines onto hosts.

The placement manager 134 may evaluate many different placement configurations. Each placement configuration may be a set of specific virtual machines that are executed on a specific host device. In some embodiments, many thousands, millions, or more placement configurations may be evaluated. For each placement configuration, a score may be computed for an optimizing parameter. For example, each configuration may have a power consumption score from which an optimized configuration may be selected.

Embodiment 100 is an example of a datacenter. Other applications may include the distribution of virtual machines onto personal computers for performing computational problems as background processes. The personal computers may be located throughout the world and used to perform large scale computational problems in one embodiment.

Figure 2:
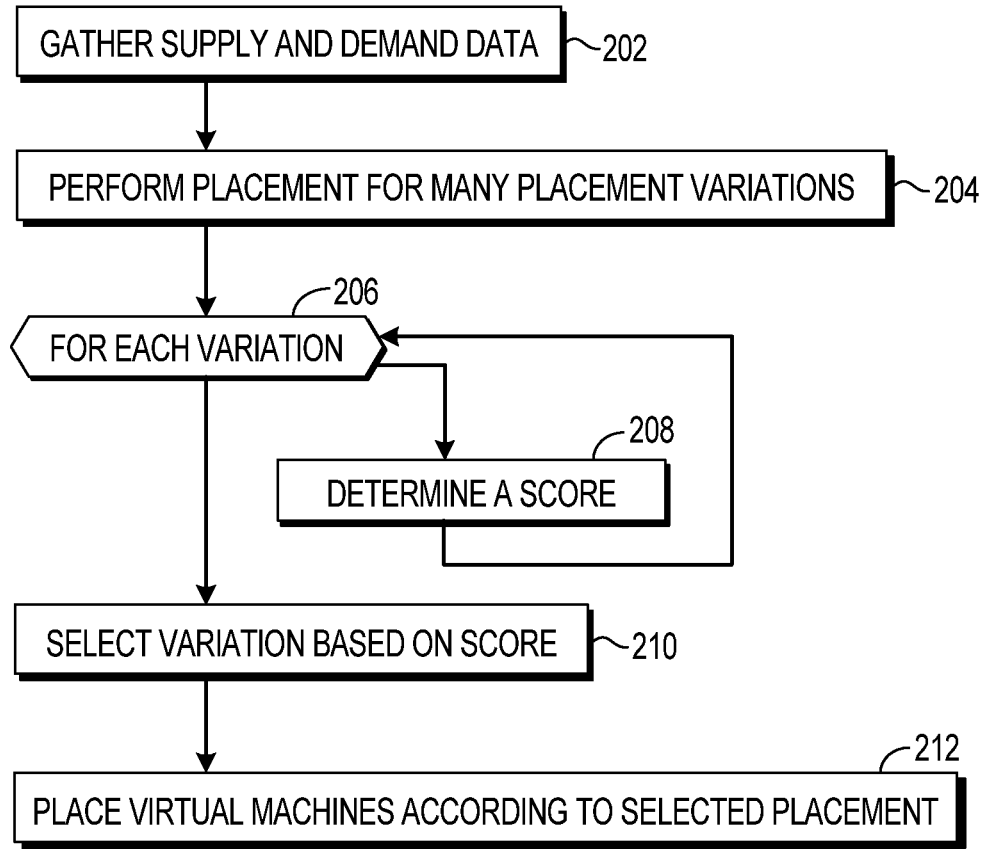
FIG. 2 is a flowchart illustration of an embodiment showing a method for managing virtual machines.

FIG. 2 is a flowchart illustration of an embodiment 200 showing a method for managing virtual machines. Embodiment 200 is a simplified example of a method that may be performed by a virtual machine manager 102 as illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a general process for determining a placement of virtual machines onto host devices. In block 202, supply and demand data may be gathered, and in block 204, many placement variations may be performed. Each variation in block 206 may be analyzed in block 208 to determine a score. Based on the score, a variation may be selected in block 210. In block 212, the virtual machines may be placed onto host devices according to the selected placement.

The process of embodiment 200 may be performed at any time several virtual machines may be placed onto host devices. For example, if a rack of host devices is to be shut down for power savings, maintenance, or some other reason, the virtual machines operating on the rack of host devices may be moved to other host devices.

The analysis of different placement options in block 204 may include using scarcity of the various dimensions to identify those host devices having a large 'size' and by packing virtual machines onto hosts based on their scarcity. This heuristic identifies those dimensions that are more likely to be difficult to satisfy when placing virtual machine.

Figure 3:
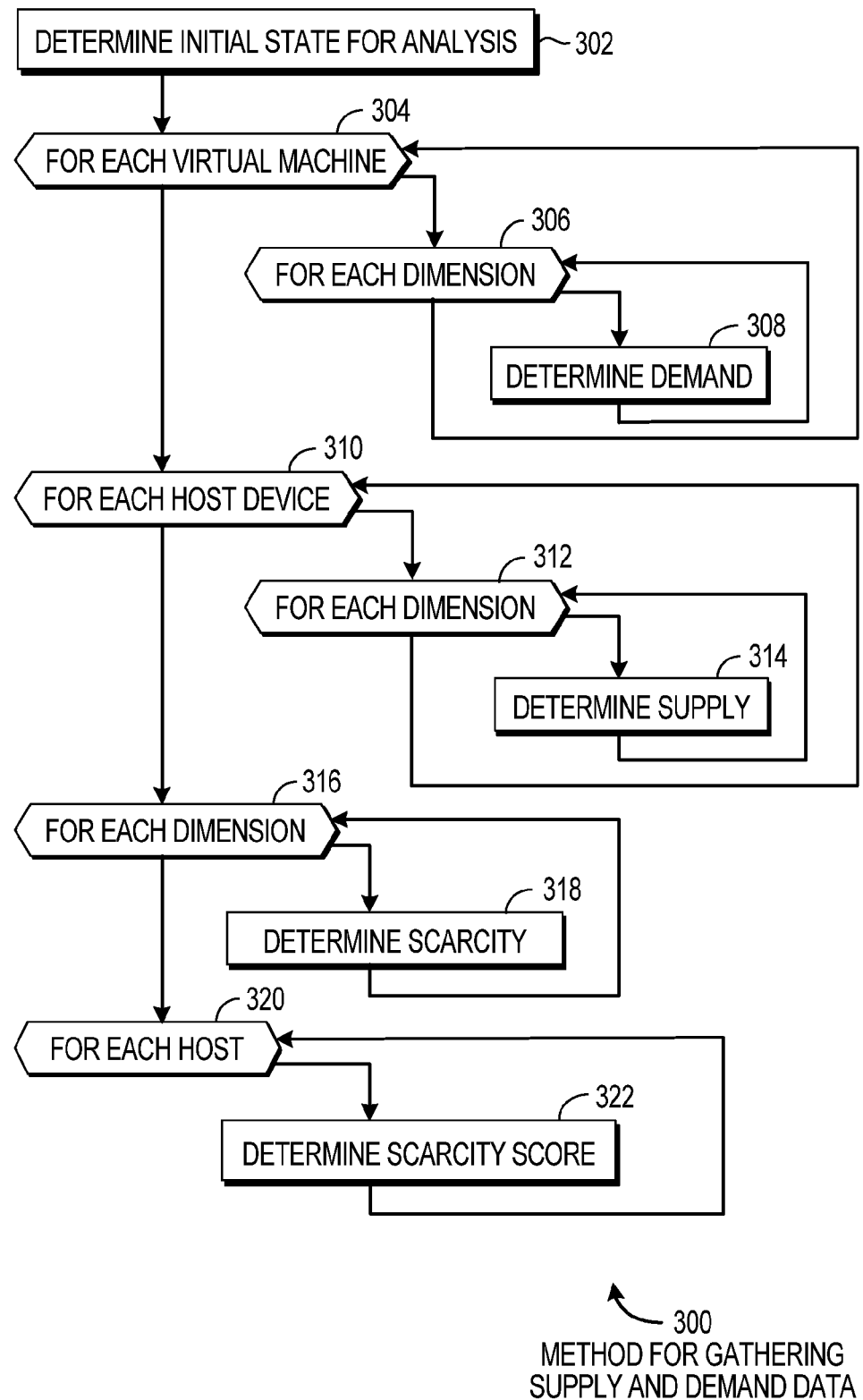
FIG. 3 is a flowchart illustration of an embodiment showing a method for gathering supply and demand data.

FIG. 3 is a flowchart illustration of an embodiment 300 showing a method for gathering supply and demand data. Embodiment 300 is a simplified example of a method that may be performed by a data gatherer 132 as illustrated in embodiment 100 and by block 202 in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is one method by which supply and demand data may be gathered. Supply data may relate to resources or other dimensions that are found on host devices, while demand data may relate to matching resources or dimensions that are used by virtual machines. After gathering data, scarcity is determined and a scarcity score may be determined for each host device.

Embodiment 300 may be performed on a set of host devices with different initial states. In one scenario, the host devices may be analyzed as if no virtual machines are currently running. In such a scenario, an optimized placement of virtual machines over an entire datacenter may be identified. In another scenario, a group of virtual machines may be placed on a datacenter or group of hosts that is already hosting a set of virtual machines.

In block 302, the initial state for analysis is determined.

In blocks 304 through 308, the demand is determined for each dimension of each virtual machine. In block 304, each virtual machine is analyzed. For each dimension in block 306, a demand for the dimension is determined in block 308.

The dimensions analyzed may vary between embodiments. In many cases, the dimensions may include consumed resources, non-consumed resources, and binary resources as well as other dimensions.

For each host device in block 310, each dimension is analyzed in block 312. The supply for the dimension is determined in block 314.

For each dimension in block 316, a scarcity is determined in block 318.

Scarcity may be determined through the following formula:

$$Scarcity_{dim} = \frac{\sum_{VM} demand_{dim}}{\left(\sum_{host} supply_{dim} - \sum_{VM} demand_{dim}\right)}$$

For each dimension, scarcity may be computed by dividing the sum of all virtual machine demand by the difference between the sum of all host supply and the sum of all virtual machine demand. Scarcity is a dimensionless number for each dimension. A high scarcity value indicates that the dimension is scarce, while a low scarcity value indicates that the dimension is plentiful.

In block 320, each host is analyzed. In block 322, a scarcity score for the host is determined. The scarcity score may indicate the 'size' of a host in terms of the scarcity of its resources. Those hosts having the largest supply of scarce resources are considered 'large'.

The scarcity for each host may be determined using the following formula:

$$ScarcityScore_{host} = \sum_{dim} \left(\frac{Capacity_{host} * Scarcity_{dim}}{MaxCapcity_{dim}}\right)$$

The scarcity score for each host may be the sum of a factor for each dimension. The factor may be computed by multiplying the capacity of the dimension for the host by the scarcity of the dimension, then dividing by the maximum capacity of any host for the dimension.

Figure 4:
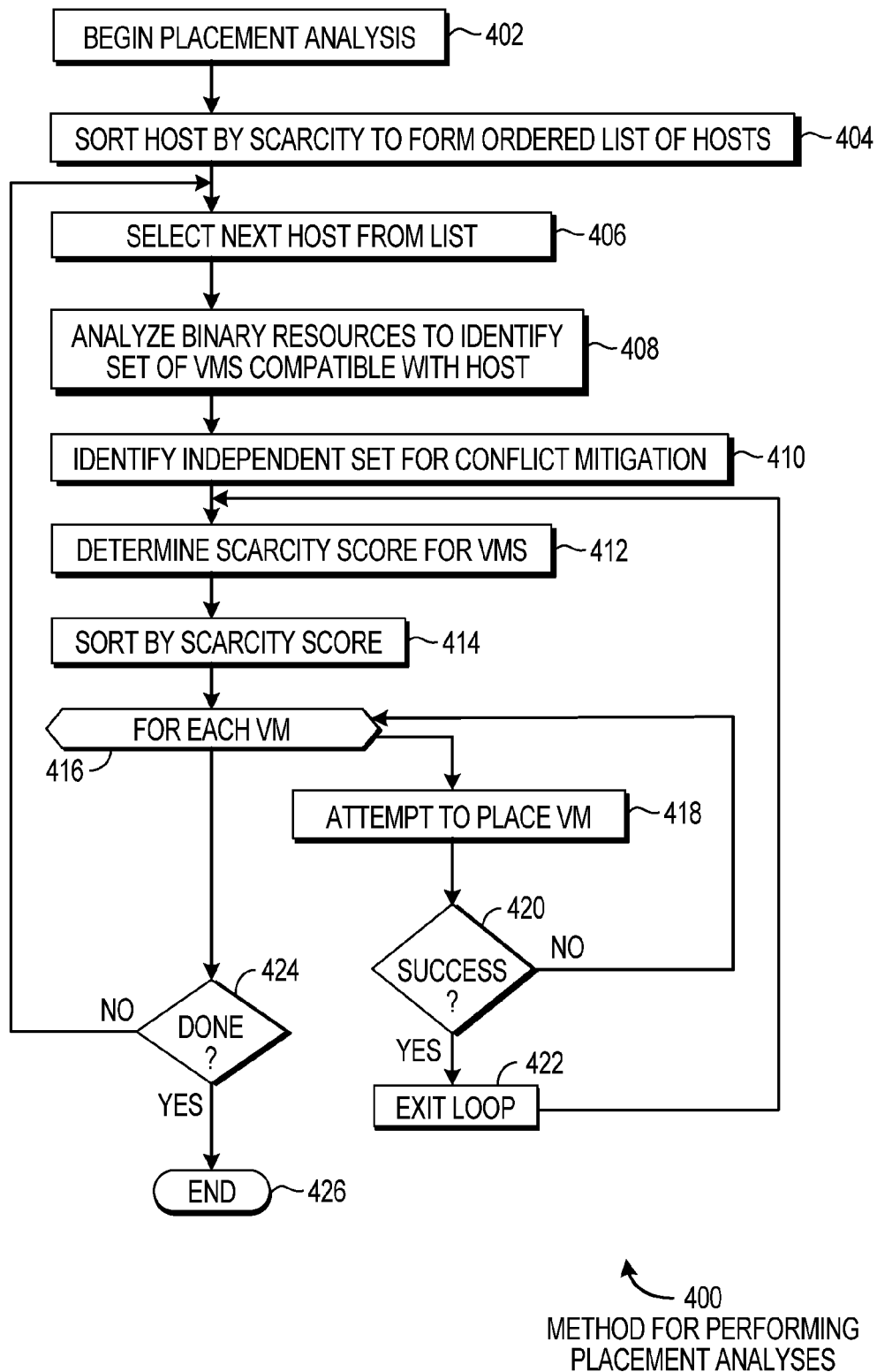
FIG. 4 is a flowchart illustration of an embodiment showing a method for performing placement analyses.

FIG. 4 is a flowchart illustration of an embodiment 400 showing a method for performing a placement analysis. Embodiment 400 is a simplified example of a method that may be performed by a placement manager 134 as illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of a heuristic that may be used to identify potential virtual machine placements. In many embodiments, the heuristic of embodiment 400 may be performed to generate many different virtual machine placements, each of which may be scored and one of which may be selected for implementation. In some such embodiments, different parameters within the method of embodiment 400 may be altered to select different hosts or different virtual machines to generate different virtual machine placements.

In some embodiments, the method of embodiment 400 may be performed once to place multiple virtual machines. In such an embodiment, the computation time used for a lengthy optimization may be skipped and a reasonable placement may be made.

The placement analysis may be started in block 402.

The hosts may be sorted using the scarcity score in block 404. The scarcity score may be used to generate an ordered list of hosts, from which the first host may be selected in block 406.

After the host is selected in block 406, the virtual machines may be attempted to be placed on the host. After analyzing all of the virtual machines, the next host is selected and the process is repeated.

In block 408, the binary resources available on the host are used to identify those virtual machines that are compatible with the host. The virtual machines that are not compatible with the host may be excluded from the analysis.

Binary resources may be any resource or dimension that is either present on the host or not. In many cases, the virtual machine may not consume the binary resource. An example may be a graphics processor that is used by a virtual machine.

In block 410, an independent set of virtual machines may be identified for conflict mitigation. In some embodiments, some virtual machines may or may not be located on the same hosts for a variety of reasons. For example, some virtual machines operate as redundant copies of each other and are operated on separate virtual machines.

In selecting the independent set of virtual machines in block 410, some embodiments may perform the process of embodiment 400 multiple times for each independent set. Each time the process is performed, a separate virtual machine placement may be generated and scored. An optimized virtual machine placement may be selected based on the score.

For the set of virtual machines being considered, a scarcity score for the virtual machines may be determined. One formula for determining the scarcity of the virtual machines is as follows:

$$VMScore = \sum_{dim} e^{scarcity_{dim}} * \left( \frac{Capacity_{host} * Scarcity_{dim}}{MaxCapacity_{dim}} \right)^p$$

The virtual machine score uses a similar formula for determining the host score, but raises the capacity times scarcity divided by max capacity to a power. Different embodiments may use different values of P. However, suitable results may be obtained with P=2.

The power term may enable virtual machines that consume very scarce resources to be weighted higher than other virtual machines. Other embodiments may use different formulas for generating a score for virtual machines.

In block 414, the virtual machines may be sorted by scarcity score, and in block 416, each virtual machine may be analyzed according to the scarcity score order.

The current virtual machine may be attempted to be placed on the host in block 418. In some cases, a virtual machine may consume more resources than are available or may be incompatible for some other reason, making the attempted placement a failure in block 420. In such a case, the next virtual machine may be analyzed in block 416.

If a virtual machine can be successfully placed in block 420, the loop of block 416 may be exited in block 422 and the process may return to block 412. When the process returns to block 412, the virtual machines may be re-scored using the VMScore formula above, but using the current capacity of the virtual machine. As virtual machines are placed on a host, the host's resources may be used up. As some resources are used up, some may become more scarce than others. Performing another analysis of the virtual machines in block 412 allows for the consumption of resources and may be better able to use the available resources when re-computing the virtual machine scarcity.

After each virtual machine is analyzed in block 416, if some virtual machines still are not placed and additional hosts have not been analyzed, the process may return to block 406 from block 424. If the process is done in block 424, the process may end in block 426.

Embodiment 400 is an example of a heuristic that may be used for generating one or many virtual machine placements. In some cases, the process of embodiment 400 may be performed for different independent sets of virtual machines in block 410. In other cases, the process of embodiment 400 may be performed by analyzing every third virtual machine in the sorted list in block 416. Another example may be to perturb the ordered list of hosts to create different variations. Other embodiments may alter different parameters within the process of embodiment 400 to generate different virtual machine placements.

When a virtual machine placement is created, the virtual machine placement may be scored. In one embodiment, the scoring may be according to power consumption, although other embodiments may have different scoring and analysis mechanisms.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method of determining placement of a plurality of virtual machines onto a plurality of host devices, said the method comprising:
   calculating a resource scarcity factor for each of a plurality of resources; and
   for each of the plurality of host devices, calculating a host device size by:
      calculating a device scarcity score for each of a plurality of resources; and summing the device scarcity scores for each of the plurality of resources to determine the host device size; and
determining the placement of the plurality of virtual machines onto the plurality of host devices, including:
for each host device in the plurality of host devices, performing a loop comprising:
selecting a set of virtual machines, from among the plurality of virtual machines, to consider placing on the host device;
determining a virtual machine order for the selected set of virtual machines, the virtual machine order having a top;
looping through the set of virtual machines according to the virtual machine order and attempting to place the selected set of virtual machines onto the host device; and
when no virtual machines are capable of being placed on the host device, exiting the loop and selecting a next host device from the plurality of host devices with which to perform the loop until the selected virtual machines in the set of virtual machines are exhausted.

2. The method of claim 1, wherein looping through the set of virtual machines comprises:
calculating a virtual machine scarcity score for each of the plurality of resources; and
ranking each of the selected set of virtual machines based on their corresponding virtual machine scarcity score; and
reordering the selected set of virtual machines based on the rankings.

3. The method of claim 1, wherein selecting a set of virtual machines comprises identifying at least one binary resource for each virtual machine in the selected set of virtual machines.

4. The method of claim 1, wherein the plurality of resources includes one or more of: consumed resources and non-consumed resources.

5. The method of claim 1, wherein at least one resource, from among the plurality of resources, includes a plurality of subresources, the device scarcity score for the at least one resource based on a scarcity of the plurality of subresources.

6. The method of claim 1, further comprising selecting a first virtual machine placement based on a cost factor for the plurality of host devices.

7. The method of claim 1, further comprising selecting a first virtual machine placement based on a power consumption score associated with the selected set of virtual machines.

8. A method for use at a computer system, the method for placing a group of virtual machines onto a plurality of host devices, said method comprising:
identifying one or more types of resources the group of virtual machines is to utilize;
for each resource type in the one or more types of resources, calculating a scarcity of each resource type based on an aggregate supply of each resource type available at the plurality of host devices and an aggregate demand for each resource type from the group of virtual machines;
for each host device in the plurality of host devices, determining a size of each host device based on, for each of the one or more resources types: the host supply of each resource type available at the host device and a corresponding calculated scarcity for each resource type, the determined size of each host device representative of an availability of scarce resource types at the host device;
for each virtual machine in the group of virtual machines, determining a virtual machine scarcity score for each virtual machine based on, for each of the one or more resource types, a virtual machine demand for each resource type and the corresponding calculated scarcity for the resource type; and
deploying the group of virtual machines onto the plurality of host devices in a manner that minimizes consumption costs associated with the one or more types of resources by comparing host device sizes for at least some of the plurality of host devices to scarcity scores for at least some of the group of virtual machines.

9. The method of claim 8, wherein identifying one or more types of resources the group of virtual machines is to utilize comprises identifying electricity as a resource the group of virtual machines is to consume.

10. The method of claim 8, wherein the identifying one or more types of resources the group of virtual machines is to utilize comprises identifying at least one consumed resource and at least one non-consumed resource.

11. The method of claim 8, further comprising prior to deploying the group of virtual machines, selecting the group of virtual machines for deployment based on a cost factor associated with the plurality of host devices.

12. The method of claim 8, wherein deploying the group of virtual machines onto the plurality of host devices comprises deploying the group of virtual machines onto the plurality of host devices in a data center.

13. The method of claim 12, wherein the identifying one or more types of resources the group of virtual machines is to utilize comprises identifying one or more types of resources within the data center.

14. The method of claim 13, wherein the identifying one or more types of resources within the data center comprises identifying one or more of: processor resources, memory resources, storage resources, and network resources within the data center.

15. A computer program product for use at a computer system, the computer program product for implementing a method for placing a group of virtual machines onto a plurality of host devices, the computer program product comprising one or more computer storage memories having stored thereon computer-executable instructions that, when executed at a processor, cause the computer system to perform the method, including the following:
identify one or more types of resources the group of virtual machines is to utilize;
for each resource type in the one or more types of resources, calculate a scarcity of each resource type based on an aggregate supply of each resource type available at the plurality of host devices and an aggregate demand for each resource type from the group of virtual machines;
for each host device in the plurality of host devices, determine a size of each host device based on, for each of the one or more resources types: the host supply of each resource type available at the host device and a corresponding calculated scarcity for each resource type, the determined size of each host device representative of an availability of scarce resource types at the host device;
for each virtual machine in the group of virtual machines, determine a virtual machine scarcity score for each virtual machine based on, for each of the one or more resource types, a virtual machine demand for each resource type and the corresponding calculated scarcity for the resource type; and deploy the group of virtual machines onto the plurality of host devices in a manner that minimizes consumption costs associated with the one or more types of resources by comparing host device sizes for at least some of the plurality of host devices to scarcity scores for at least some of the group of virtual machines.

16. The computer program product of claim 15, wherein computer-executable instructions that, when executed, cause the computer system to identify one or more types of resources the group of virtual machines is to utilize comprise computer-executable instructions that, when executed, cause the computer system to identify electricity as a resource the group of virtual machines is to consume.

17. The computer program product of claim 15, wherein computer-executable instructions that, when executed, cause the computer system to identify one or more types of resources the group of virtual machines is to utilize comprise computer-executable instructions that, when executed, cause the computer system to identify at least one consumed resource and at least one non-consumed resource.

18. The computer program product of claim 15, further comprising computer-executable instructions that, when executed, cause the computer system to, prior to deploying the group of virtual machines, select the group of virtual machines for deployment based on a cost factor associated with the plurality of host devices.

19. The computer program product of claim 15, wherein computer-executable instructions that, when executed, cause the computer system to deploy the group of virtual machines onto the plurality of host devices comprise computer-executable instructions that, when executed, cause the computer system to deploy the group of virtual machines onto the plurality of host devices in a data center.

20. The computer program product of claim 19, wherein computer-executable instructions that, when executed, cause the computer system to identify one or more types of resources the group of virtual machines is to utilize comprise computer-executable instructions that, when executed, cause the computer system to identifying one or more types of resources within the data center.

* * * * *